United States Patent
Arroyo

[11] Patent Number: 5,822,484
[45] Date of Patent: Oct. 13, 1998

[54] LIGHTWEIGHT OPTICAL GROUNDWIRE

[75] Inventor: Candido John Arroyo, Lithonia, Ga.

[73] Assignee: Lucent Technologies Inc., Murray Hill, N.J.

[21] Appl. No.: 668,197

[22] Filed: Jun. 21, 1996

[51] Int. Cl.[6] .................................................. G02B 6/44
[52] U.S. Cl. ........................ 385/101; 385/112; 385/113
[58] Field of Search ..................................... 385/100–114

[56] References Cited

U.S. PATENT DOCUMENTS

| | | | |
|---|---|---|---|
| 3,692,924 | 9/1972 | Nye | 174/120 R |
| 4,371,234 | 2/1983 | Parfree et al. | 350/96.23 |
| 4,392,714 | 7/1983 | Briiggendieck et al. | 350/96.23 |
| 4,661,406 | 4/1987 | Gruhn et al. | 428/397 |
| 4,693,551 | 9/1987 | Blanco et al. | 350/96.23 |
| 4,767,182 | 8/1988 | Parfree et al. | 350/96.23 |
| 4,807,962 | 2/1989 | Arroyo et al. | 350/96.23 |
| 4,844,575 | 7/1989 | Kindard et al. | 350/96.23 |
| 4,867,526 | 9/1989 | Arroyo | 350/96.23 |
| 4,874,219 | 10/1989 | Arroyo et al. | 350/96.23 |
| 4,909,592 | 3/1990 | Arroyo et al. | 350/96.23 |
| 4,952,012 | 8/1990 | Stamnitz | 350/96.23 |
| 5,125,062 | 6/1992 | Marlier et al. | 385/101 |
| 5,131,064 | 7/1992 | Arroyo et al. | 385/102 |
| 5,224,192 | 6/1993 | Wagman | 385/112 |
| 5,329,605 | 7/1994 | Wargotz | 385/107 |
| 5,495,546 | 2/1996 | Bottoms, Jr. et al. | 385/101 |

FOREIGN PATENT DOCUMENTS

| | | | |
|---|---|---|---|
| 04163807 | 9/1992 | Japan | H01B 11/22 |
| 2230109A | 10/1990 | United Kingdom | G02B 6/44 |

*Primary Examiner*—John Ngo

[57] ABSTRACT

An optical groundwire includes an organizer made of glass fibers held together in a matrix. A plurality of core tubes containing optical fibers are retained within the organizer. A plurality of conductors are wrapped about the organizer to form a sheath.

17 Claims, 2 Drawing Sheets

LIGHTWEIGHT OPTICAL GROUNDWIRE

This invention relates to a cable designed to function as an electrical power groundwire and which also includes optical fibers. More particularly, it relates to a cable including an organizer made of a glass fiber material held together in a matrix, the organizer having disposed therein one or more core tubes containing one or more optical fibers, and the organizer being enclosed in a sheath formed of a plurality of conductors.

BACKGROUND OF THE INVENTION

Power groundwires are usually bare conductors suspended horizontally between supporting power line masts or towers, typically above the power lines. Power groundwires are used to capture energy surges from lightning strikes and other sources and transfer such energy, through the supporting masts, to the ground. Groundwires are neutral, meaning they are not used to transmit electricity, but they must be conductive so that they can conduct the captured current to the grounding tower where the current is carried to the ground. Thus, groundwires are commonly copper or aluminum-clad copper. They may also be steel or other conducting metal.

In most countries, power companies have established right of ways all across the country for overhead power lines. Commonly, a power company will lease its right-of-way to another company requiring transmission paths, such as, for example, a telephone company. Because the power company wishes to lease as much space on its right of way as possible, it has an incentive to combine cable capacities, that is to use cables having more than one function.

One type of cable combination that has been implemented is a power groundwire that includes optical fibers. This cable is commonly referred to as an optical groundwire (OGW). For a practical employment of such a cable, the fragile nature of optical fibers must be taken into account. Optical fibers are mechanically fragile, exhibiting low strain fracture under tensile loading and degraded light transmission when bent. In addition, optical fibers are thermally fragile, and will melt at high temperatures.

Groundwires have been developed that include optical fibers. One OGW is sold by FOCAS, Inc. of Alpharetta, Ga., under the trademark SKYLITE™. This OGW includes a central fluted member made of aluminum, having grooves in which core tubes containing optical fibers are received. The fluted member is encased in a sheath formed of a plurality of bare copper or steel outer conductors helically wrapped around the fluted member. This OGW has the advantage that the outer conductors and the aluminum central fluted member serve as conductors to carry electrical current received from lightning and other sources to the grounding tower. Another advantage to this OGW is that the optical fibers are protected from mechanical damage because the fibers are retained within core tubes that are retained within the groves of the organizer.

A disadvantage of the above discussed OGW is that the central fluted member, being aluminum, conducts power and may heat up and cause damage to the core tubes containing the optical fibers. In addition, the aluminum fluted member is heavy and adds substantial weight to the groundwire, which makes the groundwire more troublesome to install.

The prior art teaches other types of cables that include central members or organizers made of materials other than aluminum. For example, U.S. Pat. No. 4,807,962 to Arroyo et al. discloses an optical fiber cable having sufficient smoke and flame retardant properties to be used as a riser cable. The cable has a fluted strength member core made of a glass fiber material held together in a matrix such as epoxy or urethane. Other prior art teaches fluted cores made from plastic such as poly(vinyl chloride) (PVC) and polyvinylidene fluoride (PVDF).

SUMMARY OF THE INVENTION

The present invention is an optical groundwire (OGW) that includes an organizer made out of a glass fiber material held together in a matrix. The organizer has disposed therein one or more core tubes, each including one or more optical fibers. The OGW further includes a sheath formed of a plurality of conductors wrapped about the organizer, preferably in a helical fashion.

In a preferred embodiment of the invention, the organizer is a fluted member having a plurality of ribs extending radially from a central portion and defining a plurality of grooves, with each groove being disposed between two adjacent ribs. A core tube is disposed in each groove. The fluted core may be twisted along its length so that the core tubes positioned in the grooves have a helical lay.

Optionally, the cable may include a core wrap to assist in retaining the core tubes in place. The core wrap is preferably a layer of super absorbent tape that protects the organizer and the core tubes from encountering moisture and perhaps becoming damaged therefrom.

The current carrying capacity of the presently disclosed OGW is lower than that of prior art cables having an aluminum organizer. Therefore, the current carrying capacity of the outer conductors in the presently disclosed groundwire is increased. This can be done by increasing the diameter of the copper portion of the outer conductors. Other optional ways to increase the current carrying capacity are to change the conductor material or to increase the number of conductors.

The groundwire assembly of the present invention is substantially as flexible as prior art groundwire assemblies, and, further, is of substantially lighter weight. Moreover, because the central organizer does not conduct electricity, it does not heat up. Therefore, there is much less risk of thermal damage to the optical fibers.

The various principles and features of the present invention will become more readily apparent from the following detailed description, read in conjunction with the accompanying drawings.

DETAILED DESCRIPTION

Figure 1:
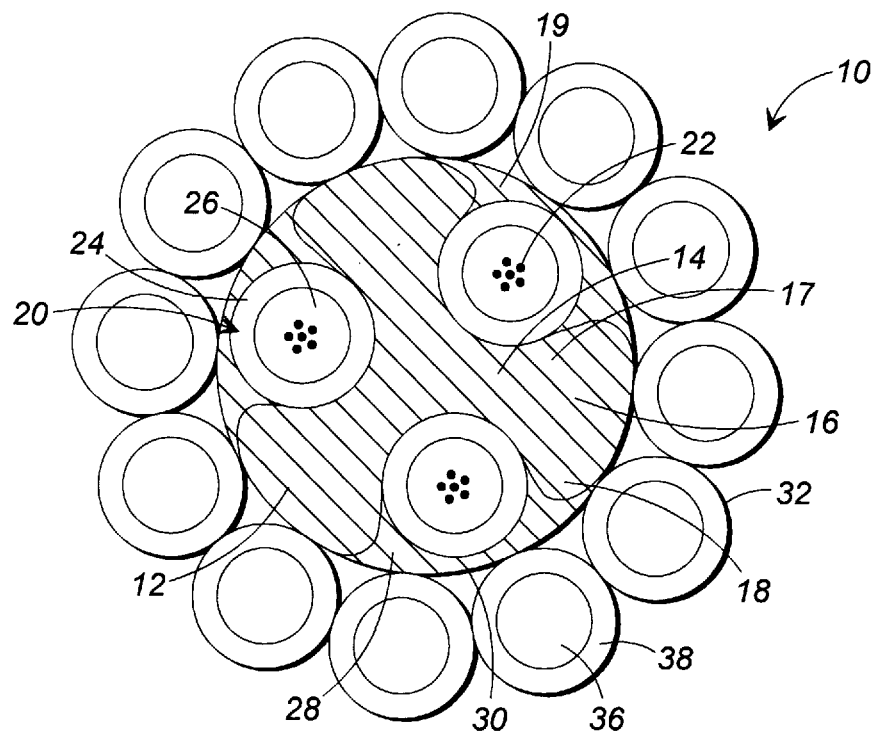
FIG. 1 is an end-sectional view of a cable of the present invention.
Figure 2:
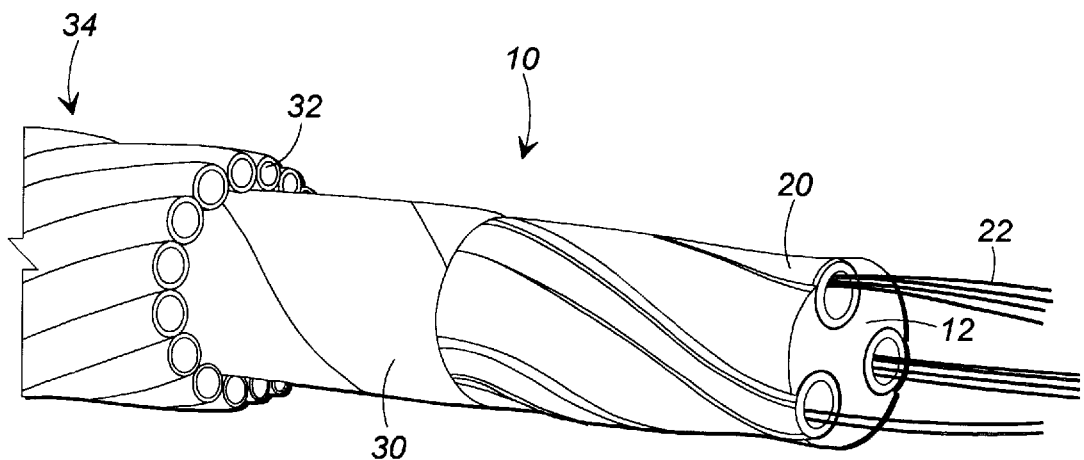
FIG. 2 is a perspective view of the cable of FIG. 1.

Referring now to FIGS. 1 and 2, there is shown a first embodiment of an optical groundwire of the present invention, which is designated generally as 10. As can be seen in the figures, the groundwire includes a central organizer 12 which is fluted, or grooved. Fluted organizer 12 includes a center portion 14 and a plurality of ribs 16 extending radially from center portion 14. Ribs 16 are formed so that a groove 19 results between each two adjacent ribs 16 of the fluted organizer 12. Each rib 16 has a relatively narrow neck portion 17 connected to an enlarged head portion 18. The grooves are generally semi-circular in cross-section and the opposing head portions of adjacent ribs extend inwardly toward the groove therebetween to partially close off the groove. The embodiment of the cable shown in FIGS. 1 and 2 includes three spaced ribs forming three grooves. It is to be understood that any practical number of grooves are possible.

Fluted organizer 12 is made of a substantially non-conductive high strength material which provides excellent mechanical properties for support of OGW 10. In the preferred embodiment, the fluted organizer 12 is made of glass fibers held together by a matrix material such as an epoxy resin or a polyurethane plastic material. An appropriate material is made by Air Logistics Corp. of Pasadena, Calif.

A core tube 20 is disposed in each groove 19. Each core tube 20 includes a plurality of optical fibers 22 encased in a tube or jacket 24 formed of a plastic such as polyethylene or poly (butylene terephthalate) (PBT). In the preferred embodiment, the core tubes 20 are assembled according to loose tube technology. Tube 24 may be filled with a filling compound 26 which protects the optical fibers, which may be thixotropic and water resistant. Such filling compounds are well known in the art.

As is more clearly shown in FIG. 2, a core wrap 30 encloses the fluted organizer 12 with its retained core tubes 20. This core wrap 30 can comprise a tape containing super absorbent or water-swellable powder. Such a tape may have a laminated structure, such as a water-swellable powder sandwiched between two non-woven tissues. Alternatively, the tape may be a non-woven, web-like tape impregnated with a water-swellable material. Such tapes are taught in U.S. Pat. No. 4,909,592 to Arroyo et al., the disclosure of which is incorporated herein by reference.

Core wrap 30 helps maintain core tubes 20 in position in grooves 19. In addition, the inwardly extending enlarged head portions of two opposing ribs help to hold a core tube in place. The portions of grooves 19 that are not filled by core tubes 20 can be filled with a filling compound 28 that is water resistant, such as one currently used for similar applications.

As shown in FIG. 2, fluted organizer 12 has helically formed grooves 19 so that the core tubes 20 and optical fibers 22 located therein have a lay. This allows the optical fibers to bend toward the neutral axis of groundwire 10 which, of course, from a bending standpoint, offers less chance for damage to the fibers.

A layer of conductors 32 stranded around fluted organizer 12 forms a sheath 34 about OPW 10. Conductors 32 preferably are wound with a helical twist, as shown in FIG. 2. Conductors 32 preferably have a copper core 36 clad with aluminum cladding 38. The amount of copper in the core 36 can be increased if a greater degree of conductivity is required. In particular, because the conductive aluminum fluted organizer used in a prior art OGW has been replaced with a nonconductive material, the conductivity of the outer conductors should in some cases be increased over that of prior art OGWs.

Figure 3:
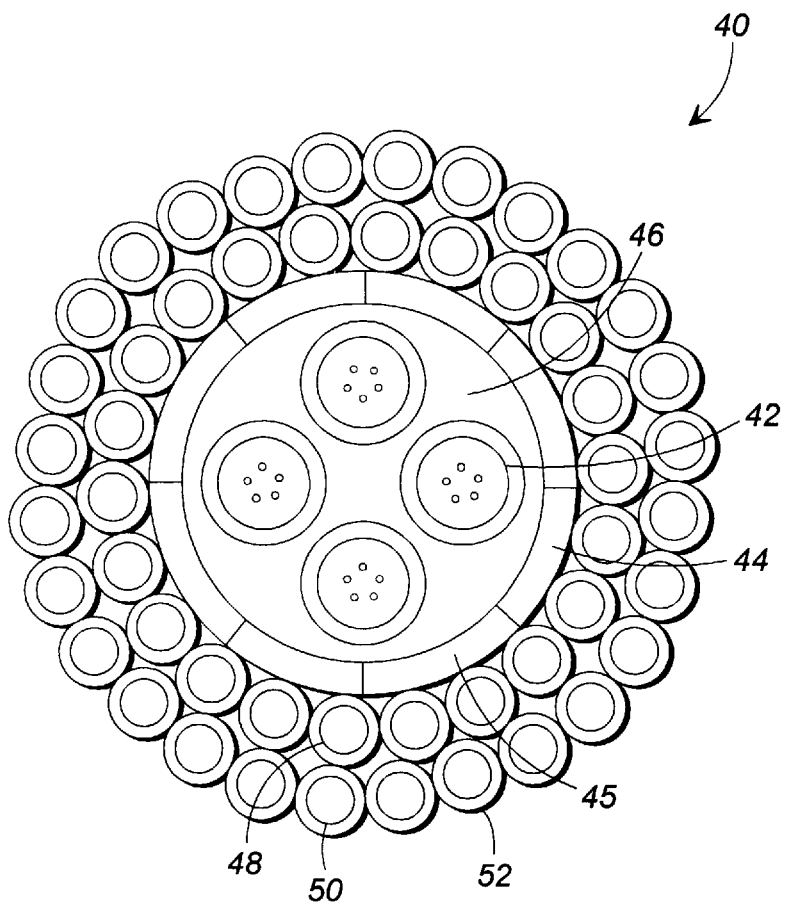
FIG. 3 is an end-sectional view of a second embodiment of a cable of the present invention.

A second embodiment of the groundwire is shown in FIG. 3 and is designated generally by 40. A plurality of core tubes 42 are retained by a tubular organizer 44. Organizer 44 is comprised of a plurality of longitudinally extending strength members 45 each of which has an arcuately shaped cross-section transverse to a longitudinal axis thereof. The members are arranged generally contiguous to each other along facing adjacent longitudinal edge surfaces to form a substantially circular enclosure. Such an arrangement is disclosed in U.S. Pat. No. 4,874,219 to Arroyo et al., the disclosure of which is incorporated herein by reference. Each of the members 45 is made of a material comprising glass fibers held together in a matrix.

Core tubes 42 are the same type as those described above, and filling compound 46 is retained within the organizer 44. A double layer 48, 49 of conductors 50 are arranged around organizer 44, preferably with layers 48 and 50 wrapped in opposite helical directions. The provision of a double layer of conductors compensates for the lack of a central organizer that is conductive as in prior art cables.

The principles of the invention illustrated as applied in preferred embodiments. Various modifications or alternatives might occur to workers in the art without departing from the spirit and scope of these principles.

What is claimed is:

1. For use in optical transmission, a groundwire comprising:

an organizer made of an electrically non-conducting strength material;

a plurality of core tubes made of a nonmetallic material, contained by said organizer, each of said plurality of core tubes having a plurality of optical fibers contained within each of said tubes, and a sheath enclosing said organizer and said core tubes, said sheath comprising a plurality of electrically conducting members surrounding said organizer and said core tubes contained thereby.

2. The groundwire as claimed in claim 1 wherein said organizer comprises a matrix containing glass fiber material.

3. The groundwire as claimed in claim 2 wherein said matrix is formed of an epoxy material.

4. The groundwire as claimed in claim 2 wherein said matrix is formed of a urethane material.

5. The groundwire of claim 1, wherein said conductive members are aluminum-clad copper.

6. The groundwire of claim 1, wherein said organizer is a fluted member having a central portion and arms radially extending therefrom forming grooves, and wherein said tube members are retained within said grooves.

7. The groundwire of claim 1, further comprising a core wrap enclosing said organizer.

8. The groundwire of claim 7, wherein said core wrap is a super absorbent containg tape.

9. The groundwire of claim 1, wherein said conductive members are wrapped helically around said organizer.

10. The groundwire of claim 1, wherein said conductive members are arranged in two layers and wherein said layers are helically wrapped in opposite directions about said organizer.

11. The optical groundwire of claim 1, wherein said organizer is formed of a plurality of longitudinally extending segments each of which has an arcuately shaped cross section transverse to a longitudinal axis of the cable, said segments cooperating to form a sheath enclosing said at least one core tube with facing longitudinal edge surfaces of adjacent segments preformed to be substantially contiguous.

12. The optical groundwire of claim 11, wherein said segments are stranded helically about said at least one core tube.

13. The groundwire of claim 1, wherein said plurality of core tubes are wrapped helically within said organizer around a central axis of said organizer.

14. For use in optical transmission, a groundwire comprising:

an organizer made of an electrically nonconducting strength material, said organizer is formed of a plurality of longitudinally extending segments each of which has an arcuately shaped cross section transverse to a longitudinal axis of the groundwire;

at least one core tube made of a nonmetallic material, said core tube contained by said organizer, said core tube having a plurality of optical fibers contained within said tube;

a sheath enclosing said organizer and said core tubes, said sheath comprising a plurality of electrically conducting members surrounding said organizer and said core tubes contained thereby; and wherein said segments cooperate to form a sheath enclosing said at least one core tube with facing longitudinal edge surfaces of adjacent segments preformed to be substantially contiguous.

15. The groundwire of claim 14, wherein said conductive members are aluminum-clad copper.

16. The groundwire of claim 14, further comprising a core wrap enclosing said organizer.

17. The optical groundwire of claim 14, wherein said segments are stranded helically about said at least one core tube.

* * * * *